US012514261B2

(12) United States Patent
Jamsazzadeh Kermani et al.

(10) Patent No.: US 12,514,261 B2
(45) Date of Patent: Jan. 6, 2026

(54) FOOD COMPOSITIONS COMPRISING CACAO POD HUSK

(71) Applicant: PURATOS, Groot-Bijgaarden (BE)

(72) Inventors: Zahra Jamsazzadeh Kermani, Zellik (BE); Jean-Luc Soyeur, Ollignies (BE)

(73) Assignee: PURATOS, Groot-Bijgaarden (BE)

( * ) Notice: Subject to any disclaimer, the term of this patent is extended or adjusted under 35 U.S.C. 154(b) by 664 days.

(21) Appl. No.: 17/909,790

(22) PCT Filed: Apr. 16, 2021

(86) PCT No.: PCT/EP2021/059930
§ 371 (c)(1),
(2) Date: Sep. 7, 2022

(87) PCT Pub. No.: WO2021/209609
PCT Pub. Date: Oct. 21, 2021

(65) Prior Publication Data
US 2024/0225034 A1    Jul. 11, 2024

(30) Foreign Application Priority Data

Apr. 17, 2020 (BE) .................................. 2020/5253

(51) Int. Cl.
*A23G 1/30*        (2006.01)
*A21D 13/32*       (2017.01)
(Continued)

(52) U.S. Cl.
CPC ............. *A23G 1/305* (2013.01); *A21D 13/32* (2017.01); *A21D 13/38* (2017.01); *A23G 1/0009* (2013.01);
(Continued)

(58) Field of Classification Search
CPC .......... A23L 33/22; A23L 21/12; A23G 1/305
See application file for complete search history.

(56) References Cited

U.S. PATENT DOCUMENTS

2019/0357560 A1    11/2019  Ceballos

FOREIGN PATENT DOCUMENTS

CA    3 091 105 A1    8/2018
EP    3 613 297 A1    2/2020
(Continued)

OTHER PUBLICATIONS

Machine translation of JP 2009-263275, publication date Nov. 12, 2009, pp. 1-22. (Year: 2009).*

(Continued)

*Primary Examiner* — Jenna A Watts
(74) *Attorney, Agent, or Firm* — Amster, Rothstein & Ebenstein LLP

(57) ABSTRACT

The present invention provides food compositions such as jellied food pastes comprising cacao pod husk (CPH). More specifically, the present invention provides compositions comprising from 5.0 to 70.0% (dry matter weight/w) of one or more sugars; from 0.150 to 7.50% (dry matter weight/w) of CPH; from 0.10 to 4.0% (w/w) of pectin; from 0.10 to 7.0% (w/w) of one or more co-texturizers; from 0.030 to 3.0% (w/w) of citrate ions; from 0.0010 to 0.50% (w/w) of calcium ions; from 0.0 to 2.0% (w/w) of preservative; and water up to 100.0%; wherein the composition has a Brix comprised from 45 to 75 and a pH from 2.8 and 4.5. The present invention further relates to food products comprising such compositions and processes to obtain them.

19 Claims, 3 Drawing Sheets

(51) Int. Cl.
    *A21D 13/38*     (2017.01)
    *A23G 1/00*     (2006.01)
    *A23G 1/32*     (2006.01)
    *A23G 1/40*     (2006.01)
    *A23G 1/54*     (2006.01)
    *A23L 21/12*     (2016.01)
    *A23L 29/231*     (2016.01)
    *A23L 29/256*     (2016.01)

(52) U.S. Cl.
    CPC ............... *A23G 1/325* (2013.01); *A23G 1/40* (2013.01); *A23G 1/54* (2013.01); *A23L 21/12* (2016.08); *A23L 29/231* (2016.08); *A23L 29/256* (2016.08)

(56) References Cited

FOREIGN PATENT DOCUMENTS

| | | | | |
|---|---|---|---|---|
| EP | 3009001 | A1 | 4/2020 | |
| JP | 2009189356 | A1 | 8/2009 | |
| JP | 2009263275 | A * | 11/2009 | ............. A61K 36/18 |
| RU | 2623238 | C2 | 6/2017 | |
| WO | 2018/147718 | A2 | 8/2018 | |
| WO | 2020/038906 | A1 | 2/2020 | |

OTHER PUBLICATIONS

R. Martinez et al., "Chemical, technological and in vitro antioxidant properties of cocoa (*Theobroma cacao* L.) co-products", Food Research International, vol. 49, No. 1, 2012, pp. 39-45, XP028951924, ISSN: 0963-9969, doi.org/10.1016/j.foodres.2012.08.005.

PCT International Preliminary Report on Patentability mailed on Jun. 20, 2022 in connection with PCT/EP2021/059930.

PCT International Search Report mailed on Aug. 10, 2021 in connection with PCT/EP2021/059930.

PCT Written Opinion of the International Searching Authority Report mailed on Aug. 10, 2021 in connection with PCT/EP2021/059930.

Chinese Office Action as Issued On Dec. 6, 2023 in Respect to Counterpart Chinese Patent Application No. 202180029000.2 and Its English Translation.

Russian Office Action as Issued on Sep. 20, 2024 in Respect to Counterpart Russian Patent Application No. 2022129361 and Its English Translation.

\* cited by examiner

FOOD COMPOSITIONS COMPRISING CACAO POD HUSK

CROSS-REFERENCE TO RELATED APPLICATIONS

This application is a U.S. national stage entry under 35 U.S.C. § 371 of PCT International Patent Application No. PCT/EP2021/059930, filed Apr. 16, 2021, which claims priority to Belgian Patent Application No. 2020/5253, filed Apr. 17, 2020, the contents of each of which are incorporated herein by reference in their entirety.

FIELD OF THE INVENTION

The present invention relates to the field of food processing. More specifically, the present invention relates to jellied food pastes, in particular to jellied food pastes used as fillings and/or toppings in sweet bakery, patisserie and other confectionery applications. The present invention further relates to food products comprising such food jellied pastes and processes to obtain them.

BACKGROUND OF THE INVENTION

Current food trends include the development of healthier products, the search for new and/or more natural sources of ingredients and the search for ingredients with new and/or improved properties and functionalities.

Fillings for sweet bakery or confectionery products are usually made based on the property of hydrocolloids to form a gel under certain conditions. Gelation of starch for example depends on its concentration, the processing temperature and the presence of water. Other hydrocolloids such as alginate or pectin require the presence of divalent cations. However, to develop a filling with a satisfactory texture and flavour it is generally needed to add additional ingredients such as additional hydrocolloids, fruit extracts, flavouring agents (such as artificial flavours), etc. This may lead in some cases to an increase of the labelling requirements or a decrease of the stability of the product (e.g. the microbial stability).

Cacao pod husk (CPH), which is a main by-product (52-76% fresh fruit weight) of the cacao harvest, is generally discarded on the farm as an organic fertilizer. However, this untreated CPH can also be a source of the black pod rot disease that causes an annual yield loss of about 20 to 30% worldwide. Alternative uses are today of low value and include soap making, animal feed or activated carbon. Other ways of valorisations, such as paper making and to a lesser extend biofuels production have also been explored. However, CPH is a rich source of fibres (lignin, cellulose, hemicellulose and pectin), as well as antioxidants (polyphenols). For these reasons, valorisation of the cacao pod husk based on its chemical composition towards more added value applications not only prevents the annual loss on the cacao production sites but could be beneficial to several stakeholders such as farmers (additional revenues), industrials (new added value ingredients) and consumers (new and innovative products).

Therefore, there is a need to develop new food products comprising CPH.

SUMMARY OF THE INVENTION

Up till now, the incorporation of whole cacao pod husk (CPH) into food products led to undesirable textural and organoleptic properties. To avoid these undesirable properties, fractions of CPH, such as CPH extracts and CPH-derived pectin solutions, are prepared from whole CPH and integrated into food products. However, the preparation of these CPH fractions requires complex processing methods and installations and generates side streams next to the limited yield.

The present inventors have now found that whole CPH (i.e. non-fractionated and/or non-extracted CPH) can be used to improve taste and textural properties, when used in a food composition, preferably a jellied food paste, even in absence of white pulp and/or cacao beans (e.g. the bean shell and/or the bean itself). Furthermore, the taste of such food compositions, preferably jellied food pastes, comprising whole CPH was found to be unique and unpredictable. More particularly, the present inventors have surprisingly found that the texture and/or taste of food compositions, preferably jellied food pastes, comprising whole CPH becomes desirable by combining one or more sugars and water soluble hydrocolloids, such as pectin and one or more co-texturizers, with the whole CPH. The taste of such food compositions, preferably jellied food pastes, is typically described as having a fruity note associated with fig, apple, citrus, orange or sour apricot.

The present invention provides a jellied food paste comprising cacao pod husk (CPH). In particular embodiments, the jellied food paste comprises from 0.150 to 7.50% (dry matter weight/weight (w)) cacao pod husk (CPH).

In particular embodiments, the jellied food paste comprises one or more sugars, one or more food-grade water-soluble hydrocolloids, food grade citrate ions, water and optionally one or more preservatives.

In particular embodiments, the one or more food grade water-soluble hydrocolloids comprise pectin and one or more co-texturizers.

In particular embodiments, the jellied food paste has a Brix comprised from 45 to 75 and/or a pH from 2.8 and 4.5.

In particular embodiments, the CPH is CPH powder.

In particular embodiments, the CPH powder has a maximal particle size of less than 200 μm.

The present invention also provides a composition comprising
  from 5.0 to 70.0% (dry matter weight/w) of one or more sugars;
  from 0.150 to 7.50% (dry matter weight/w) of CPH;
  from 0.10 to 4.0% (w/w) of pectin;
  from 0.10 to 7.0% (w/w) of one or more co-texturizers;
  from 0.030 to 3.0% (w/w) of citrate ions;
  from 0.0010 to 0.50% (w/w) of calcium ions;
  from 0.0 to 2.0% (w/w) of preservative; and
  water up to 100.0%;
  wherein the composition has a Brix comprised from 45 to 75 and a pH from 2.8 and 4.5; and wherein the composition is a jellied food paste or a composition for preparing a jellied food paste.

In particular embodiments, the CPH is CPH powder.

In particular embodiments, the CPH powder has a maximal particle size of less than 200 μm.

In particular embodiments, the composition does not comprise white pulp from the cacao beans.

In particular embodiments, the one or more sugars are present in the form of sucrose and glucose syrup.

In particular embodiments, the glucose syrup has a dextrose equivalent of more than 55. In particular embodiments, the one or more co-texturizers are selected from the group consisting of alginates, galactomannans, locust bean gum, gellans, celluloses, starches, and carrageenans, or a combination thereof, preferably wherein the co-texturizer is alginate, more preferably sodium alginate.

In particular embodiments, the pectin has a degree of esterification of less than 50%.

The present invention also provides a food product comprising the composition as taught herein as a filling and/or topping.

The present invention also provides a method for preparing a composition as taught herein comprising the step of mixing the ingredients of the composition as taught herein. The present invention also provides a method for preparing a composition with a Brix comprised from 45 to 75 comprising from 5.0 to 70.0% (w/w) of one or more sugars;
from 0.150 to 7.50% (w/w) of CPH;
from 0.10 to 4.0% (w/w) of pectin;
from 0.10 to 7.0% (w/w) of one or more co-texturizers; preferably wherein the one or more co-texturizers comprise one or more co-texturizers that are preferably pre-dissolved or pre-dispersed at low temperature and/or one or more co-texturizers that are preferably pre-dissolved or pre-dispersed at high temperature;
from 0.030 to 3.0% (w/w) of citrate ions;
from 0.0010 to 0.50% (w/w) of calcium ions;
from 0.0 to 2.0% (w/w) of preservative; and
water up to 100.0%;
wherein the composition is a jellied food paste or a composition for preparing a jellied food paste;

(a) with the proviso that if the one or more co-texturizers consist of one or more co-texturizers that are preferably pre-dissolved or pre-dispersed in water at a low temperature said method comprises the steps of:

mixing the one or more sugars, the CPH, (part of) the citrate ions, the one or more co-texturizers that are preferably pre-dissolved or pre-dispersed in water at a low temperature and optionally part of the water, thereby obtaining a first mixture;

heating said first mixture to a temperature from 80.0° C. to 100.0° C., preferably from 85.0° C. to 95.0° C., preferably under constant stirring;

mixing pectin in the rest of the water, wherein the water is preheated to a temperature from 80.0° C. to 90.0° C. before mixing, thereby obtaining a second mixture;

mixing said first and second mixture at a temperature from 80.0° C. to 100.0° C., preferably from 85.0° C. to 95.0° C., preferably under constant stirring, thereby obtaining a third mixture;

adjusting the pH of the third mixture to a value from 2.8 to 4.5, preferably from 3.0 to 4.3, more preferably from 3.4 to 4.2;

optionally adding a preservative to the third mixture;

maintaining the third mixture at a temperature from 80.0° C. to 100.0° C., preferably from 85.0° C. to 95.0° C., for a period from 1 to 10 minutes, preferably from 3 to 6 minutes, preferably under constant stirring; and optionally packaging the mixture, preferably at a temperature above 70.0° C.;

(b) with the proviso that if the one or more co-texturizers consist of one or more co-texturizers that are preferably pre-dissolved or pre-dispersed in water at a high temperature, said method comprises the steps of:

mixing the one or more sugars, the CPH, (part of) the citrate ions and optionally part of the water, thereby obtaining a first mixture;

heating said first mixture to a temperature from 80.0° C. to 100.0° C., preferably from 85.0° C. to 95.0° C., preferably under constant stirring;

mixing pectin and the one or more co-texturizers that are preferably pre-dissolved or pre-dispersed in water at a high temperature in the rest of the water, wherein the water is preheated to a temperature from 80.0° C. to 90.0° C. before mixing, thereby obtaining a second mixture;

mixing said first and second mixture at a temperature from 80.0° C. to 100.0° C., preferably from 85.0° C. to 95.0° C., preferably under constant stirring, thereby obtaining a third mixture;

adjusting the pH of the third mixture to a value from 2.8 to 4.5, preferably from 3.0 to 4.3, more preferably from 3.4 to 4.2;

optionally adding a preservative to the third mixture;

maintaining the third mixture at a temperature from 80.0° C. to 100.0° C., preferably from 85.0° C. to 95.0° C., for a period from 1 to 10 minutes, preferably from 3 to 6 minutes, preferably under constant stirring; and optionally packaging the mixture, preferably at a temperature above 70.0° C.;

(c) with the proviso that if the one or more co-texturizers consist of one or more co-texturizers that are preferably pre-dissolved or pre-dispersed in water at a low temperature and one or more co-texturizers that are preferably pre-dissolved or pre-dispersed in water at a high temperature, said method comprises the steps of:

mixing the one or more sugars, the CPH, (part of) the citrate ions, the one or more co-texturizers that are preferably pre-dissolved or pre-dispersed in water at a low temperature and optionally part of the water, thereby obtaining a first mixture;

heating said first mixture to a temperature from 80.0° C. to 100.0° C., preferably from 85.0° C. to 95.0° C., preferably under constant stirring;

mixing pectin and the one or more co-texturizers that are preferably pre-dissolved or pre-dispersed in water at a high temperature in the rest of the water, wherein the water is preheated to a temperature from 80.0° C. to 90.0° C. before mixing, thereby obtaining a second mixture;

mixing said first and second mixture at a temperature from 80.0° C. to 100.0° C., preferably from 85.0° C. to 95.0° C., preferably under constant stirring, thereby obtaining a third mixture;

adjusting the pH of the third mixture to a value from 2.8 to 4.5, preferably from 3.0 to 4.3, more preferably from 3.4 to 4.2;

optionally adding a preservative to the third mixture;

maintaining the third mixture at a temperature from 80.0° C. to 100.0° C., preferably from 85.0° C. to 95.0° C., for a period from 1 to 10 minutes, preferably from 3 to 6 minutes, preferably under constant stirring; and optionally packaging the mixture, preferably at a temperature above 70.0° C.

The present invention also provides the use of the composition as taught herein as a filling and/or a topping on a food product, preferably a sweet product.

The present invention also provides the use of CPH as a flavouring agent in a composition; wherein the composition is a jellied food paste or a composition for preparing a jellied food paste.

DETAILED DESCRIPTION OF THE INVENTION

Figure 1:
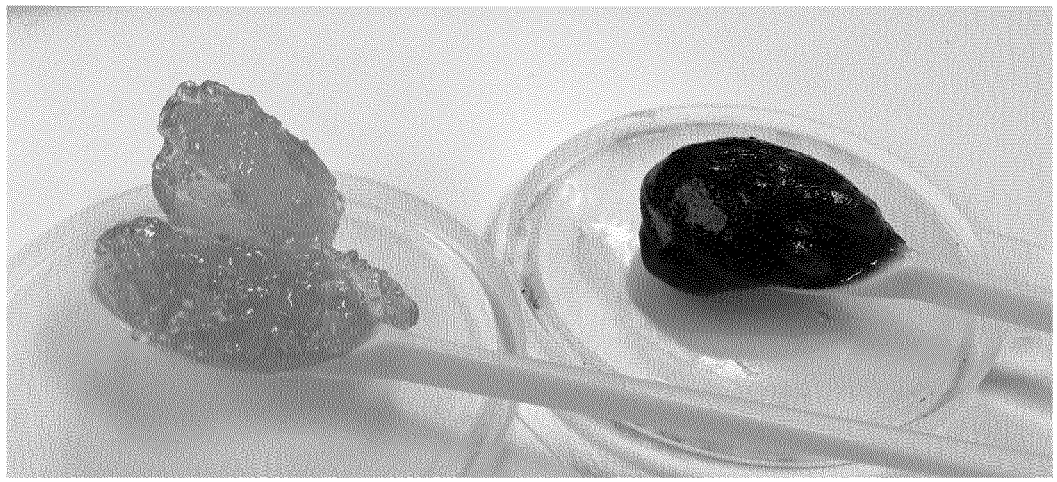
FIG. 1 shows a reference composition (left) and a composition according to the invention (right).

Before the present method and devices used in the invention are described, it is to be understood that this invention is not limited to particular methods, components, or devices described as such methods, components, and devices may, of course, vary. It is also to be understood that the terminology used herein is not intended to be limiting, since the scope of the present invention will be limited only by the appended claims. Unless defined otherwise, all technical and scientific terms used herein have the same meaning as commonly understood by one of ordinary skill in the art to which this invention belongs. Although any method and material similar or equivalent to those described herein may be used in practice or testing of the present invention, the preferred methods and materials are now described.

In this specification and the appended claims, the singular forms "a", "an", "the" include both the singular and the plural, unless the context clearly indicates otherwise.

The terms "comprising", "comprises" and "comprised of" as used herein are synonymous with "including", "includes" or "containing", "contains", and are inclusive or open-ended and do not exclude additional, non-recited members, elements or method steps. Where this description refers to a product or process which "comprises" specific features, parts or steps, this refers to the possibility that other features, parts or steps may also be present, but may also refer to embodiments which only contain the listed features, parts or steps. The terms "comprising", "comprises" and "comprised of" also include the term "consisting of".

The enumeration of numeric values by means of ranges of figures comprises all values and fractions in these ranges, as well as the cited end points.

The terms "about" and "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "about" or "approximately" refers per se has also been disclosed. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Incorporating whole cacao pod husk (CPH) into food compositions is challenging due to the development of undesirable properties such as an unappreciated texture (e.g. hard in case of bread) or a bitter taste. CPH is typically processed to obtain refined CPH fractions, such as purified pectin, to overcome such undesirable properties. However, refining of CPH is not cost nor energy effective for the countries of origin since it requires complex processing methods and installations, has a limited yield, and generates other side streams.

The inventors of the present application have surprisingly found compositions and methods that take into account those parameters and drawbacks. More particularly, present inventors have surprisingly found that the texture (including the visual aspect and the mouthfeel) and/or taste of food compositions, preferably jellied food pastes, more preferably sweet jellied food pastes, becomes desirable by incorporating (whole) CPH, preferably (whole) CPH powder, into the food composition, even in absence of the introduction of white pulp and/or cacao beans. Preferably, the (whole) CPH is combined with one or more sugars and water soluble hydrocolloids, such as pectin and one or more co-texturizers. The texture and taste of such food compositions, preferably jellied food pastes, more preferably sweet jellied food pastes, is excellent, unique, unpredictable and surprising. For example, although the taste and texture of the composition as taught herein are always experienced as agreeable, individuals might experience the taste and/or structure differently. The taste of such food compositions can generally be described as being new, unique, tasty, rich, delicate, without artificial flavour, sweet and/or having a fruity note associated with fig, apple, citrus, orange and/or sour apricot. The texture of such food compositions is generally described by an expert taste panel as being pleasant, smooth, not-sticky, thick, melting, slightly grainy and/or very elastic. The composition as taught herein comprising (whole) CPH does not require any artificial flavouring agent to improve the taste and encompasses a high degree of fibers as well as antioxidants. Therefore, the composition as taught herein is a healthier alternative compared to, for example, known sweet jellied food pastes which do not comprise CPH. The invention relates to a food composition, preferably a jellied food paste, comprising CPH.

In particular embodiments, the food composition, preferably the jellied food paste, comprises from 0.150 to 7.50% (dry matter weight/weight (w)) CPH.

In particular embodiments, the food composition, preferably the jellied food paste, comprises one or more food grade water-soluble hydrocolloids and one or more food grade cations, preferably one or more food grade cations selected from the group consisting of $Ca^{2+}$, $Ba^{2+}$, $Fe^{2+}$, $Sr^{2+}$, $Mg^{2+}$, $Mn^{2+}$ and $Al^{3+}$.

In particular embodiments, the one or more food grade water-soluble hydrocolloids comprise pectin and one or more co-texturizers.

In particular embodiments, the food composition, preferably the jellied food paste, further comprises one or more sugars, citrate ions, water and optionally one or more preservatives.

In particular embodiments, the food composition, preferably the jellied food paste, has a Brix comprised from 45 to 75 and/or a pH from 2.8 and 4.5.

The present invention also provides a composition comprising, essentially consisting of (i.e. at least 70% (w/w), at least 80% (w/w), at least 90% (w/w), at least 95% (w/w), or at least 99% (w/w)) or consisting of:
  from 5.0 to 70.0% (dry matter weight/w) of one or more sugars;
  from 0.150 to 7.50% (dry matter weight/w) of cacao pod husk;
  from 0.10 to 4.0% (w/w) of pectin;
  from 0.10 to 7.0% (w/w) of one or more co-texturizers;
  from 0.030 to 3.0% (w/w) of citrate ions;
  from 0.0010 to 0.50% (w/w) of calcium ions;
  from 0.0 to 2.0% (w/w) of preservative; and
  water up to 100.0%;
  wherein said composition has a Brix from 45 to 75 and a pH from 2.8 to 4.5, wherein the composition is a jellied food paste or a composition for preparing a jellied food paste.

In particular embodiments, in the composition as taught herein,
  the total amount of one or more sugars is from 5.0 to 70.0% (dry matter weight/w);
  the total amount of cacao pod husk is from 0.150 to 7.50% (dry matter weight/w);
  the total amount of pectin is from 0.10 to 4.0% (w/w);
  the total amount of one or more co-texturizers is from 0.10 to 7.0% (w/w);
  the total amount of citrate ions is from 0.030 to 3.0% (w/w);
  the total amount of calcium ions is from 0.0010 to 0.50% (w/w); and
  the total amount of preservative is from 0.0 to 2.0% (w/w).

In particular embodiments, the composition comprises from 5.0 to 70.0% (dry matter weight/w), preferably from 10.0 to 65.0% (dry matter weight/w), more preferably from 20.0 to 60.0% (dry matter weight/w), even more preferably from 30.0 to 55.0% (dry matter weight/w) of one or more sugars.

The term "sugar" as used herein refers to any sugar or combination of sugars suitable for food applications, preferably suitable for filling and/or topping applications. There are various types of sugar, including simple sugars, such as monosaccharides and disaccharides, and longer chains of sugars, called oligosaccharides. Sugars are preferably mono- and/or disaccharides.

In particular embodiments, the one or more sugars are monosaccharides, disaccharides or mixtures thereof. In more particular embodiments, the one or more sugars are selected from the group consisting of sucrose, fructose, glucose, maltose or mixtures thereof. Even more preferred, the sugar is sucrose.

The one or more sugars may be present in the composition in form of one or more sugar sources, such as one or more sugar-based sweeteners. The sugar-based sweetener may be any non-refined, partially refined or refined (pure) sugar-based sweetener. Non-limiting examples of sugar-based sweeteners include (white) refined (crystallized) sucrose, brown sugar, mill white sugar, invert sugar, (high) fructose syrups such as corn syrup, honey, glucose syrups, maple syrup, brown rice syrup, barley malt, agave nectar, cane sugar, and coconut sugar.

The term "sweetener" as used herein generally refers to any food-grade substance or composition suitable for food applications, preferably suitable for filling and/or topping applications, having a sweet taste and/or that gives a sweet taste to the product into which it is incorporated. Sugar-based sweeteners typically comprise substances other than sugar in addition to the sugar. For example, honey is composed of sugar (about 76% (w/w)), water (about 18% (w/w)) and other ingredients such as minerals, proteins, acids and undetermined matter. The one or more sugars present in honey are typically fructose, glucose and sucrose.

If the one or more sugars are present in the composition as taught herein in the form of one or more sugar-based sweetener, the amount of the one or more sugars in the composition as taught herein is calculated as the amount of one or more sugar (e.g. the total amount of monosaccharides and/or disaccharides) present in the composition and not as the amount of one or more sugar-based sweeteners present in the composition. For example, if the one or more sugars are monosaccharides and/or disaccharides, the amount of one or more sugars in the composition as taught herein is the sum of any monosaccharides and disaccharides present in the composition. Preferably the amount of one or more sugars in the composition is the sum of the amount of sucrose (calculated as pure sucrose), fructose (calculated as pure fructose), glucose (calculated as pure glucose) and maltose (calculated as pure maltose).

In particular embodiments, a part of the one or more sugars may be replaced by an artificial (i.e. synthetic) sweetener. The person skilled in the art will know how to determine the amount of one or more sugars to be replaced by an artificial sweetener while maintaining a Brix index from 45 to 75. Non-limiting examples of artificial sweeteners include acesulfame potassium, aspartame, sucralose, D-tagatose, and saccharin.

In particular embodiments, the amount of one or more sugars does not encompass the amount of sugar present in the CPH of the composition as taught herein. Accordingly, the composition comprises from 5.0 to 70.0% (dry matter weight/w), preferably from 10.0 to 65.0% (dry matter weight/w), more preferably from 20.0 to 60.0% (dry matter weight/w), even more preferably from 30.0 to 55.0 (dry matter weight/w) of one or more sugars, in addition to the one or more sugars present in the CPH.

In particular embodiments, the one or more sugars are present in the composition as taught herein in the form of a mixture of sucrose and glucose syrup.

Glucose syrup is a sugar-based sweetener and acts as a source of glucose, maltose and maltotriose. Preferably, the glucose syrup has a high dextrose equivalent. Glucose syrups with a high dextrose equivalent are sweeter and can serve as a humectant. In more particular embodiments, the glucose syrup has a dextrose equivalent of more than 50, more than 55, more than 60 or more than 65, preferably more than 55 or from 50 to 95 or from 55 to 65.

As the dry matter content of glucose syrups may vary considerably, the amount of glucose syrup in the composition as taught herein is expressed as the glucose syrup dry matter present in the composition as taught herein. In particular embodiments, the glucose syrup has a dry matter content of from 60.0 to 90.0%, from 65.0 to 90.0%, from 60.0 to 85.0%, from 65.0 to 85.0%, or from 70.0 to 85.0%, preferably from 70.0 to 85.0%.

Accordingly, in more particular embodiments, the composition as taught herein comprises from 5.0 to 59.0%, from 10.0 to 59.0%, from 15.0 to 59.0%, from 20.0 to 59.0%, from 25.0 to 59.0%, from 30.0 to 59.0%, from 35.0 to 59.0%, or from 38.0 to 55.0%, preferably from 38.0 to 55.0% (w/w), of glucose syrup (expressed as the percentage of dry matter content).

In particular embodiments, the composition comprises from 0.150 to 7.50% (dry matter weight/w), preferably from 0.150 to 5.0% (dry matter weight/w), more preferably from 1.0 to 3.0% (dry matter weight/w) of cacao pod husk.

The term "cacao pod husk", "CPH", "whole cacao pod husk", or "whole CPH" as used herein generally refers to the part of the cacao fruit obtained after removal of the cacao beans (i.e. including the bean shell or husk) and the white pulp surrounding the cacao beans. The CPH encompasses the whole (i.e. entire) pod shell of the cacao fruit, i.e. the epicarp, the mesocarp, the sclerotic part (i.e. layer between the mesocarp and the endocarp) and the endocarp. The CPH also encompasses the whole (i.e. entire) pod shell of the cacao fruit without the epicarp, i.e. the mesocarp, the sclerotic part (i.e. layer between the mesocarp and the endocarp) and the endocarp. The term "cacao pod husk", "CPH", "whole cacao pod husk", or "whole CPH" as used herein is not intended to refer to any extract (e.g. filtered extract) or fraction of the cacao pod husk (e.g. dietary fibre of CPH).

In preferred embodiments, the cacao pod husk is present in the composition as taught herein in the form of cacao pod husk powder.

The term "cacao pod husk powder" or "CPH powder" as used herein generally refers to CPH which is dried and subsequently grinded or milled into a powder. The drying of the CPH may be performed by sun drying, hot air drying, microwave drying or freeze drying, preferably freeze-drying or microwave drying. A non-limiting example of a process for the preparation of CPH powder is the following: after removing the cacao beans from the pod shell of the cacao fruit, the whole pod shells (i.e. including epicarp, the mesocarp, the sclerotic part and the endocarp) are cut into about 8 pieces. Then the fresh cacao pod husk pieces are sun dried for approximately 10 days to ensure material stability during a longer storage. They are subsequently grinded and sieved.

Preferably, the CPH powder is finely milled so that it can pass a 200-µm sieve or screen. Accordingly, in particular embodiments, the CPH is a CPH powder of which the maximal particle size is less than 200.0 µm.

In particular embodiments, the composition as taught herein does not comprise cacao beans, cacao bean shells or husks, and white pulp surrounding the cacao beans.

In particular embodiments, the composition as taught herein comprises from 0.10 to 4.0% (w/w), from 0.10 to 3.50% (w/w), from 0.10 to 3.0% (w/w), from 0.250 to 3.0% (w/w), from 0.250 to 3.0% (w/w), from 0.250 to 2.50% (w/w), from 0.250 to 2.0% (w/w), from 0.50 to 2.0% (w/w), preferably from 0.10 to 3.0% (w/w), more preferably from 0.50 to 2.0% (w/w), of pectin. Non-limiting examples of pectin sources are apple, citrus, lime, lemon and orange pectins.

The pectin used in the compositions of present invention may be any type of food-grade pectin and pectin derivative suitable for food applications. Pectin is a food-grade hydrocolloid which is capable of gelling in the presence of one or more divalent cations depending of its structure. The gelation mechanism of pectins is mainly governed by their degree of esterification. Preferably, the pectin in the composition has a degree of esterification (DE) from 30% to 75%, from 30% to 50% or from 30% to 45%.

In particular embodiment, the pectin present in the composition as taught herein does not encompass the pectin present in the CPH of the composition as taught herein. Accordingly, the composition as taught herein comprises from 0.10 to 3.0% (w/w), from 0.10 to 2.50% (w/w), from 0.10 to 2.0% (w/w), from 0.250 to 2.0% (w/w), from 0.250 to 2.0% (w/w), from 0.250 to 1.50% (w/w), from 0.250 to 1.0% (w/w), from 0.50 to 1.0% (w/w), preferably from 0.10 to 2.0% (w/w), more preferably from 0.50 to 1.0% (w/w), of pectin in addition to the pectin present in the CPH.

In particular embodiments, the composition as taught herein comprises from 0.10 to 7.0% (w/w), from 0.10 to 5.0% (w/w), from 0.20 to 5.0% (w/w), from 0.20 to 4.0% (w/w), from 0.10 to 3.0% (w/w), from 0.20 to 3.0% (w/w), from 0.30 to 3.0% (w/w), from 0.30 to 1.0% (w/w), or from 0.30 to 0.60% (w/w), preferably from 0.10 to 3.0% (w/w), more preferably from 0.30 to 1.0% (w/w) of one or more co-texturizers.

The term "co-texturizer" or "pectin-co-texturizer" as used herein generally refers to a food-grade ingredient that, when used in a composition comprising pectin, interacts with or links to (e.g. by hydrogen bonds or ionic interactions) the pectin during the setting or the jellification of the composition and which contributes to the texture of the composition. Non-limiting examples of suitable co-texturizers are alginates (such as sodium alginate), galactomannans, locust bean gum, gellans, celluloses including modified celluloses (such as (sodium) carboxymethyl cellulose, methyl cellulose, ethyl cellulose, hydroxyethyl cellulose, hydroxypropyl cellulose, hydroxypropyl methyl cellulose, microcrystalline cellulose), starches including physically and/or chemically-modified starches (such as hydroxypropyl distarch phosphate), carrageenans or combinations thereof.

In preferred embodiments, the one or more co-texturizers are selected from the group consisting of alginates, galactomannans, locust bean gum, gellans, celluloses, starches, and carrageenans, or a combination thereof. In more preferred embodiments, the one or more co-texturizers are selected from the group consisting of alginates, hydroxypropyl distarch phosphate, sodium carboxymethylcellulose and the combination of hydroxypropyl distarch phosphate and sodium carboxymethylcellulose. In even more preferred embodiments, the co-texturizer comprises, consists essentially of or consists of alginate, preferably sodium alginate.

In particular embodiments, the cellulose is a modified cellulose, such as (sodium) carboxymethyl cellulose, methyl cellulose, ethyl cellulose, hydroxyethyl cellulose, hydroxypropyl cellulose, hydroxypropyl methyl cellulose and microcrystalline cellulose, or a combination thereof.

In particular embodiments, the starch may be native starch, functional native starch or physically and/or chemically-modified starch. Non-limiting examples of modified starches are hydroxypropyl starch, hydroxypropyl distarch phosphate, pre-gelled starch and instant starch. The person skilled in the art will understand that the term "functional native starch" also encompasses starch with improved properties obtained by specific processing/breeding.

In particular embodiment, the amount of any co-texturizer present in CPH is not included in the amount of one or more co-texturizers present in the composition. Accordingly, the composition as taught herein comprises from 0.10 to 7.0% (w/w), from 0.10 to 5.0% (w/w), from 0.20 to 5.0% (w/w), from 0.20 to 4.0% (w/w), from 0.10 to 3.0% (w/w), from 0.20 to 3.0% (w/w), from 0.30 to 3.0% (w/w), from 0.30 to 1.0% (w/w), or from 0.30 to 0.60% (w/w), preferably from 0.10 to 3.0% (w/w), more preferably from 0.30 to 1.0% (w/w) of one or more co-texturizers in addition to the co-texturizers present in the CPH. In particular embodiments, the composition as taught herein comprises from 0.030 to 3.0% (w/w), preferably from 0.10 to 2.50% (w/w), more preferably from 0.10 to 2.0% (w/w) of citrate ions.

The term "citrate ions" as used herein generally refers to tricarboxylic acid trianions. Citrate ions may be represented by the molecular formula $C_6H_5O_7^{3-}$ or $C_3H_5O(COO)_3^{3-}$. The citrate ions can be present in the composition as taught herein under the form of citric acid (e.g. citric acid with CAS number 77-92-9), a citrate salt (e.g. trisodium citrate (also known as sodium citrate) or calcium citrate) and/or citrus (e.g. lemon) juice.

In particular embodiments, the citrate ions are present in the composition as taught herein under the form of citric acid and one or more citrate salts. The skilled person will understand that a correct balance between citrate ions under the form of citric acid and under the form of citrate salt, preferably sodium and/or calcium citrate, will ensure obtaining both the right content of calcium ions (as described elsewhere herein) and the right pH of the composition as taught herein, being a pH of from 2.8 to 4.5, preferably from 3.0 to 4.3, more preferably from 3.4 to 4.2.

In particular embodiments, the composition as taught herein comprises from 0.50 to 2.0% (w/w), preferably from 0.50 to 1.0% (w/w), of (undiluted, 100%) citric acid and from 0.05 to 0.70% (w/w), preferably from 0.10 to 0.60% (w/w), of one or more citrate salts.

In particular embodiments, the composition as taught herein comprises from 0.0010 to 0.50% (w/w), preferably from 0.010 to 0.30% (w/w) of calcium ions.

The term "calcium ions" as used herein generally refers to calcium dications. Calcium ions may be represented by the molecular formula $Ca^{2+}$. The calcium ions may be present in the composition as taught herein through their presence in one or more of the other ingredients of the composition as taught herein and/or the calcium ions may be added to the composition as taught herein under the form of a calcium salt. Accordingly, at least a part, preferably from 0.00040% to 0.040%, of the calcium ions present in the composition as taught herein may originate from the CPH in the composition as taught herein.

In particular embodiments, at least part of the calcium ions may be part of buffered pectin. In particular embodiments, the calcium ions are present in the composition as taught herein under the form of one or more calcium salts, preferably under the form of one or more calcium salts selected from the group consisting of $CaCl_2$, $CaCl_2 \cdot 2H_2O$, calcium iodate, calcium lactate, $CaSO_4$, $Ca_3(PO4)_2$, calcium propionate and calcium citrate, preferably under the form of calcium citrate.

In particular embodiments, the composition as taught herein may further comprise additional ingredients such as colouring agents, fruits, fruit pieces, fruit extracts, flavouring agents, aromas, enzymes and/or preservatives.

In particular embodiments, the composition as taught herein comprises from 0 to 2.0% (w/w), from 0 to 1.0% (w/w), from 0 to 0.10% (w/w), preferably from 0 to 1.0% (w/w), even more preferably from 0 to 0.10% (w/w) of a preservative. In further particular embodiments, the composition as taught herein comprises from 0.010 to 1.0% (w/w), from 0.010 to 0.10% (w/w), from 0.050 to 1.0% (w/w) or from 0.050 to 0.10% (w/w), preferably from 0.010 to 1.0% (w/w), even more preferably from 0.010 to 0.10% (w/w) of a preservative. The skilled person will be able to determine the suitable amount of preservative needed in the composition to achieve a particular shelf life or stability at a particular storage temperature.

In particular embodiment, the preservative does not encompass any preservative present in the composition as taught herein as a source of calcium ions and/or citrate ions. Accordingly, in particular embodiment, the preservative is not a calcium salt, such as calcium citrate. In more particular embodiments, the preservative is sodium benzoate or potassium sorbate, preferably potassium sorbate.

In particular embodiments, the water is soft water. In particular embodiments, the water comprises less than 100 ppm of calcium ions and/or less than 100 ppm of magnesium ions. In particular embodiments, the water comprises less than 0.021% of electrolytes, cations or other water competitor ingredients, such as salts and sugars.

In particular embodiments, the composition as taught herein has a Brix from 45 to 75, preferably from 60 to 68, more preferably from 64 to 66.

The term "Brix" or "Brix index" or derivatives hereof as used herein refers to a measure of sugar concentration and is typically measured using a refractometer in line with the ISO standards. In said measurement, a drop of fluid is placed on a quartz surface at one end of the instrument, the sugar in the fluid leads to bending of the light at a certain angle, depending on the quantity and said refractometer measures this angle and compares it to a scale corresponding the quantity of dissolved sugar in the mixture. One degree Brix corresponds with 1 gram of sucrose in 100 grams of solution and represents the strength of the solution as percentage by mass. If the solution comprises dissolved solids other than pure sucrose, then the Brix only approximates the dissolved solid content. The Brix as used herein is comprised from 45 to 75, preferably from 60 to 68, more preferably from 64 to 66.

In particular embodiments, the composition as taught herein has a pH from 2.8 to 4.5, preferably from 3.0 to 4.2 more preferably from 3.4 to 4.2. The person skilled in the art will understand how to determine the pH of a food composition, such as a filling, for example by pH meter.

In particular embodiments, the composition as taught herein has a Brix from 45 to 75 and a pH from 2.8 to 4.5, preferably a Brix from 60 to 68 and a pH from 3.0 to 4.3, even more preferably a Brix from 64 to 66 and a pH from 3.4 to 4.2.

In particular embodiments, the composition as taught herein has a water activity of at least 0.80, at least 0.85, at least 90, preferably at least 0.85.

It is within the ordinary competence of a skilled person to determine the right amounts of ingredients, in particular the amount of one or more sugars, to reach the desired value of Brix and water activity.

In particular embodiments, the composition as taught herein is a gelled food composition, preferably a jellied food paste, such as a sweet jellied food paste selected from the group consisting of jam, marmalade, filling for food products and topping for food products.

The present invention further provides a method for preparing a composition as taught herein comprising the step of mixing the ingredients of the composition as taught herein. In particular embodiments, the method for preparing the composition as taught herein, comprises mixing from 5.0 to 70.0% (dry matter weight/w) of one or more sugars;
from 0.150 to 7.50% (dry matter weight/w) of CPH, preferably CPH powder;

from 0.10 to 4.0% (w/w) of pectin;
from 0.10 to 7.0% (w/w) of one or more co-texturizers;
from 0.030 to 3.0% (w/w) of citrate ions;
from 0.0010 to 0.50% (w/w) of calcium ions;
from 0.0 to 2.0% (w/w) of preservative; and
water up to 100.0%;
thereby obtaining the composition as taught herein, preferably wherein the composition is a jellied food paste or a composition for preparing a jellied food paste.

It should be clear that the embodiments described herein in relation to the composition also apply for the preparation method as described herein (and vice versa).

As described elsewhere herein, the compositions as taught herein may comprise or be prepared using different types of co-texturizers which are able to interact with or link to the pectin during the setting or jellification of the composition. The use of co-texturizers such as alginates, galactomannans, locust bean gum, gellans, celluloses, starches, and carrageenans in combination with pectin is well known in the field of gelled food compositions, such as (sweet) jellied food pastes. It is therefore to be understood that the person skilled in the art will know how to handle these co-texturizers in the methods for preparing a composition as taught herein to ensure the proper functioning of these co-texturizers in combination with the pectin.

Some examples of how certain types of co-texturizers are preferably handled to allow interaction with pectin in a food composition during setting or jellification of the food composition are given below.

The skilled person knows for example that some celluloses or cellulose derivatives, such as (sodium) carboxymethylcellulose or microcrystalline cellulose, are preferably dispersed in water at low temperature (such as at a temperature between about 15.0° C. and about 35.0° C.) and/or in the absence of electrolytes, cations or other water competitor ingredients such as salts and sugars, prior to mixing said celluloses or cellulose derivatives to the other ingredients of the food composition. Mixing times and shear rates for dispersing these celluloses or cellulose derivatives in water are parameters known in the art and may be found, for example, in textbooks or technical datasheets provided by the producers. No particular mixing equipment is needed provided that it allows reaching said parameters. Although dispersion of celluloses or cellulose derivatives, such as (sodium) carboxymethylcellulose or microcrystalline cellulose, at higher temperatures is possible, lower viscosities are obtained when they are dispersed in water at temperatures above 60.0° C.

If the one or more co-texturizers comprise starch, the availability of water for the starch is important at the time of swelling and gelatinization of the starch. Instant and pregelled starch are preferably dissolved in water at low temperature (such as at a temperature between about 15.0° C. and about 35.0° C.) and the solubility of the starch can be facilitated when other water competitor ingredients such as salts and sugars are absent. Hydroxypropyl starch and hydroxypropyl distarch phosphate do not need to be dissolved as such in water before use but the availability of the water at the time of swelling and gelatinization of the starch is ensured by an appropriate dispersion in water, preferably at low temperature The skilled person will understand that when the one or more co-texturizers comprise a combination of starch and cellulose, in particular a combination of hydroxypropyl distarch phosphate and sodium carboxymethylcellulose, the dispersion of the one or more co-texturizers is preferably performed in water in the absence of the other ingredients of the food composition or during the very early stages of the method of preparing the food composition before the addition of the other ingredients of the food composition, especially when the total amount of water present in the food composition is low, thereby ensuring a complete dispersion of the starch and cellulose.

As known in the art alginate and gellan gum are co-texturizers that preferably undergo a pre-dissolution in water at high temperature (usually at a temperature between about 80° C. and 95° C.), before addition to a food composition. A complete dissolution is typically achieved in less than 20 min after mixing the alginate and/or gellan gum with the water at high temperature. The skilled person also will understand how to adequately combine an alginate or gellan gum containing solution with the other ingredients of the food composition. For example, the alginate or gellan gum containing solution may be combined with a solution of the other ingredients of the food composition that has been heated to temperature close to (e.g. differing by at most 5° C. from) the temperature of the alginate or gellan gum solution.

The use of other co-texturizers such as galactomannans or carrageenans is also well known and described. Their solubility and implementation (concentration and temperature) may be derived from their structures and compositions.

The implementation of co-texturizers in food compositions as described here above are provided as examples only and are by no way limiting the scope of the present invention. The skilled person knows that other methods of using co-texturizers in the preparation of food compositions such as (sweet) jellied food pastes are available. For example, although less suitable, alginate may be pre-dissolved at a lower temperature for a more prolonged time than described above.

In particular embodiments, the method for preparing a composition as taught herein comprises pre-dissolving or pre-dispersing one or more co-texturizers by mixing the one or more co-texturizers with a part of the water prior to mixing the one or more co-texturizers with the one or more sugars, the CPH, the pectin, the citrate ions, the calcium ions, and optionally the preservative. The person skilled in the art will understand that depending on the type of co-texturizer, the water can preferably have a low temperature, such as at a temperature from 15.0° C. to 35.0° C., or a high temperature, such as a temperature from 75.0° C. to 95.0° C. For example, if the one or more co-texturizers comprise alginate, the method for preparing a composition as taught herein comprises pre-dissolving or pre-dispersing the alginate by mixing the alginate with a part of the water at a temperature from 75.0° C. to 95.0° C. prior to mixing the alginate with the one or more sugars, the CPH, the pectin, the citrate ions, the calcium ions, and optionally the preservative. For example, if the one or more co-texturizers comprise (sodium) carboxymethylcellulose, microcrystalline cellulose, hydroxypropyl starch, hydroxypropyl distarch phosphate, instant starch, pregelled starch or a combination thereof the method for preparing a composition as taught herein comprises pre-dissolving or pre-dispersing such co-texturizer(s) by mixing it (them) with a part of the water at a temperature from 15.0° C. to 35.0° C. prior to mixing with the one or more sugars, the CPH, the pectin, the citrate ions, the calcium ions, and optionally the preservative.

The skilled person also will understand that as pectin is a hydrocolloid, it undergoes a pre-dissolution preferably at high temperature (e.g. at a temperature from 75.0° C. to 95.0° C.), prior to mixing the pectin to the other ingredients of a food composition to ensure its full hydration and to exert its full functionality in the food composition, such as a gelled food composition. Preferably, the pre-dissolution is performed at high shear. In particular embodiments, the method for preparing a composition as taught herein comprises mixing pectin with a part of the water prior to mixing the pectin with the one or more co-texturizers, the one or more sugars, the CPH, the citrate ions, the calcium ions, and optionally the preservative, wherein the water has a temperature from a temperature from 75.0° C. to 95.0° C., preferably from 80° C. to 90° C. The skilled person still knows that there exists other techniques to implement pectin in jellied food product such as high shear mixing at lower temperature.

In particular embodiments, if the one or more co-texturizers comprise, consist essentially of, or consist of one or more co-texturizers that are preferably dissolved or dispersed in water at high temperature, the method for preparing a composition as taught herein comprises mixing said one or more co-texturizers that are preferably dissolved or dispersed in water at high temperature and pectin with a part of the water prior to mixing said one or more co-texturizers that are preferably dissolved or dispersed in water at high temperature and said pectin with the one or more sugars, the CPH, the citrate ions, the calcium ions, and optionally the preservative, wherein the water at high temperature has a temperature from 75.0° C. to 95.0° C., preferably from 80.0° C. to 90.0° C.

In particular embodiments, if the one or more co-texturizers comprise, consist essentially of, or consist of one or more co-texturizers that are preferably dissolved or dispersed in water at low temperatures prior to adding the other ingredients of the composition as taught herein or in other words one or more co-texturizers that are preferably pre-dissolved or pre-dispersed in water at low temperature, the one or more sugars, the CPH (preferably CPH powder), part or all of the citrate ions, the one or more co-texturizers that are preferably pre-dissolved or pre-dispersed in water at low temperature, and optionally part of the water are mixed, thereby obtaining a first mixture. This first mixture does not comprise pectin, in addition to the pectin present in the CPH.

In particular embodiments, if the one or more co-texturizers comprise, consist essentially of, or consist of one or more co-texturizers that are preferably dissolved or dispersed in water at high temperatures prior to adding the other ingredients of the composition as taught herein or in other words one or more co-texturizers that are preferably pre-dissolved or pre-dispersed in water at high temperature, the one or more sugars, the CPH (preferably CPH powder), part or all of the citrate ions, and optionally a first part of the water are mixed, thereby obtaining a first mixture, preferably wherein said first mixture is prepared or heated at temperature of between 80.0° C. and 100.0° C., preferably between 85.0° C. and 95.0° C. This first mixture does not comprise the one or more co-texturizers that are preferably dissolved or dispersed in water at high temperatures prior to adding the other ingredients of the composition as taught herein or pectin in addition to the pectin present in the CPH of the composition as taught herein.

In particular embodiments, if the one or more sugars comprise glucose syrup, the glucose syrup is preferably heated to a temperature from 45.0° C. to 50.0° C. prior to adding to the glucose syrup the CPH, part or all of the citrate ions, and optionally the first part of the water.

In particular embodiments, if the one or more co-texturizers comprise starch or modified starch, the first mixture can be heated to a temperature from 85.0° C. to 95.0° C., preferably from 90.0° C. to 95.0° C., for a period of from 1 to 15 minutes or from 1 to 10 minutes, preferably from 5 to 10 minutes. Heating of the first mixture comprising starch will allow the starch to fully gelatinize.

In particular embodiments, if the one or more co-texturizers comprise, consist essentially of, or consist of one or more co-texturizers that are preferably dissolved or dispersed in water at low temperatures prior to adding the other ingredients of the composition as taught herein, the pectin and a second part or all of the water are mixed, thereby obtaining a second mixture, wherein the water has a temperature from 75.0° C. to 95.0° C., preferably from 80° C. to 90° C. In particular embodiments, this second mixture does not comprise the one or more sugars, the CPH (preferably CPH powder), the one or more co-texturizers that are preferably pre-dissolved or pre-dispersed in water at low temperature and the citrate ions of the composition as taught herein.

In particular embodiments, if the one or more co-texturizers comprise, consist essentially of, or consist of one or more co-texturizers that are preferably dissolved or dispersed in water at high temperatures prior to adding the other ingredients of the composition as taught herein, the pectin and the one or more co-texturizers that are preferably dissolved or dispersed in water at high temperatures prior to adding the other ingredients of the composition as taught herein and a second part or all of the water are mixed, thereby obtaining a second mixture, wherein the water has a temperature from 80° C.0 to 90.0° C. In particular embodiments, this second mixture does not comprise the one or more sugars, the CPH (preferably CPH powder) and the citrate ions. Preferably, if the one or more co-texturizers comprise, consist essentially of, or consist of one or more co-texturizers that are preferably dissolved or dispersed in water at high temperatures prior to adding the other ingredients of the composition as taught herein, the ingredients of the second mixture are mixed until the one or more co-texturizers are dissolved or dispersed.

In particular embodiments, after having obtained the first mixture and the second mixture, the first mixture and the second mixture are mixed together at a temperature from 80.0° C. to 100.0° C., preferably from 85.0° C. to 95.0° C., thereby obtaining a third mixture. Preferably, the first and the second mixture are mixed together under constant stirring. Preferably, the first mixture is heated to a temperature of from 80.0° C. to 100.0° C., preferably from 85.0° C. to 95.0° C., more preferably from 90.0° C. to 95.0° C., prior to adding the second mixture to the first mixture. More preferably, the first mixture is heated under constant stirring. In particular embodiments, the pH of the third mixture is adjusted to a value from 2.8 to 4.5, preferably from 3.0 to 4.3, more preferably from 3.4 to 4.2. Adjusting the pH of the composition as taught herein is common knowledge and may be performed by, for example, the addition of a citric acid solution, such as a 50% (w/w) citric acid solution.

In particular embodiments, the preservative is added to the third mixture comprising one or more sugars, CPH, pectin, one or more co-texturizers, citrate ions and calcium ions, preferably wherein said third mixture has a temperature of from 80.0° C. to 100.0° C., preferably from 85.0° C. to 95.0° C.

In particular embodiments, after obtaining the third mixture, optionally comprising a preservative, the third mixture is maintained at a temperature from 80.0° C. to 100.0° C., preferably from 85.0° C. to 95.0° C., for a period of from 1 to 10 minutes, preferably from 3 to 6 minutes. Preferably, the third mixture is not cooled to a temperature below 70.0°

C. after the step of preparing the third mixture and before the step of maintaining the third mixture at a temperature from 80.0° C. to 100.0° C.

The person skilled in the art will understand that heating of a composition may lead to a loss of water in the composition. Accordingly, an amount of water may be added during the step of maintaining the third composition at a temperature from 80.0° C. to 100.0° C. for a period from 1 to 10 minutes equal to the amount of water which evaporated during the step of maintaining the third composition at a temperature from 80.0° C. to 100.0° C. for a period from 1 to 10 minutes.

In particular embodiments, the method for preparing the composition as taught herein, further comprises a step of cooling the third mixture. Cooling of the mixture may be achieved by packaging the composition and subsequently cooling the packaged composition. Accordingly, in particular embodiments, the method for preparing the composition as taught herein, comprises a step of packaging the composition. Preferably, the composition as taught herein is packaged by hot packaging to ensure a good conservation of the composition after its preparation. The term "hot packaging" as used herein refers to a packaging method wherein the product to be packaged is directly transferred into a suitable (e.g. heat-resistant) container while the product is still hot. Preferably, the product has a temperature of at least 70.0° C., upon packaging. Preferably, the product has a temperature of from 70.0° C. to 85.0° C., while pouring said third mixture into said containers. Preferably, the headspace between the composition as taught herein and the lid of the container is as small as possible. For example, the distance between the lid of the container and the composition as taught herein is at most 1.0 cm.

In other embodiments, the headspace between the composition as taught herein and the lid of the container is flushed with an inert gas, such as, but not limited to, nitrogen or carbon dioxide.

The present invention provides a method for preparing a composition with a Brix comprised from 45 to 75, preferably from 60 to 68, more preferably from 64 to 66, comprising
  from 5.0 to 70.0% (dry matter weight/w) of one or more sugars;
  from 0.150 to 7.50% (dry matter weight/w) of CPH, preferably CPH powder;
  from 0.10 to 4.0% (w/w) of pectin;
  from 0.10 to 7.0% (w/w) of one or more co-texturizers;
  from 0.030 to 3.0% (w/w) of citrate ions;
  from 0.0010 to 0.50% (w/w) of calcium ions;
  from 0.0 to 2.0% (w/w) of preservative; and
  water up to 100.0%;
  preferably wherein the composition is a jellied food paste or a composition for preparing a jellied food paste;
  (a) with the proviso that if the one or more co-texturizers consist of one or more co-texturizers that are preferably pre-dissolved or pre-dispersed in water at a low temperature, such as sodium carboxymethylcellulose microcrystalline cellulose, hydroxypropyl starch, hydroxypropyl distarch phosphate, instant starch, pregelled starch or a combination thereof, preferably a combination of sodium carboxymethylcellulose and hydroxypropyl distarch phosphate, said method comprises the steps of:
    mixing the one or more sugars, the CPH, (part of) the citrate ions, the one or more co-texturizers that are preferably pre-dissolved or pre-dispersed in water at a low temperature, preferably at a temperature from 15.0° C. to 35.0° C., and optionally part of the water, thereby obtaining a first mixture;
    heating said first mixture to a temperature from 80.0° C. to 100.0° C., preferably from 85.0° C. to 95.0° C., preferably under constant stirring;
    mixing pectin in the rest of the water, wherein the water is preheated to a temperature from 80.0° C. to 90.0° C. before mixing, thereby obtaining a second mixture;
    mixing said first and second mixture at a temperature from 80.0° C. to 100.0° C., preferably from 85.0° C. to 95.0° C., preferably under constant stirring, thereby obtaining a third mixture;
    adjusting the pH of the third mixture to a value from 2.8 to 4.5, preferably from 3.0 to 4.3, more preferably from 3.4 to 4.2;
    optionally adding a preservative to the third mixture;
    maintaining the third mixture at a temperature from 80° C. to 100° C., preferably from 85° C. to 95° C., for a period from 1 to 10 minutes, preferably from 3 to 6 minutes, preferably under constant stirring; and
    optionally packaging the mixture, preferably at a temperature above 70° C.;
  (b) with the proviso that if the one or more co-texturizers consist of one or more co-texturizers that are preferably pre-dissolved or pre-dispersed in water at a high temperature, such as alginate, said method comprises the steps of:
    mixing the one or more sugars, the CPH, (part of) the citrate ions and optionally part of the water, thereby obtaining a first mixture;
    heating said first mixture to a temperature from 80.0° C. to 100.0° C., preferably from 85.0° C. to 95.0° C., preferably under constant stirring;
    mixing pectin and the one or more co-texturizers that are preferably pre-dissolved or pre-dispersed in water at a high temperature in the rest of the water, wherein the water is preheated to a temperature from 80.0° C. to 90.0° C. before mixing, thereby obtaining a second mixture;
    mixing said first and second mixture at a temperature from 80.0° C. to 100.0° C., preferably from 85.0° C. to 95.0° C., preferably under constant stirring, thereby obtaining a third mixture;
    adjusting the pH of the third mixture to a value from 2.8 to 4.5, preferably from 3.0 to 4.3, more preferably from 3.4 to 4.2;
    optionally adding a preservative to the third mixture;
    maintaining the third mixture at a temperature from 80° C. to 100° C., preferably from 85° C. to 95° C., for a period from 1 to 10 minutes, preferably from 3 to 6 minutes, preferably under constant stirring; and
    optionally packaging the mixture, preferably at a temperature above 70° C.;
  (c) with the proviso that if the one or more co-texturizers consist of one or more co-texturizers that are preferably pre-dissolved or pre-dispersed in water at low temperatures and one or more co-texturizers that are preferably pre-dissolved or pre-dispersed in water at high temperatures, said method comprises the steps of:
    mixing the one or more sugars, the CPH, (part of) the citrate ions, the one or more co-texturizers that are preferably pre-dissolved or pre-dispersed in water at low temperatures and optionally part of the water, thereby obtaining a first mixture;
    heating said first mixture to a temperature from 80.0° C. to 100.0° C., preferably from 85.0° C. to 95.0° C., preferably under constant stirring;
    mixing pectin and the one or more co-texturizers that are preferably pre-dissolved or pre-dispersed in water at high temperatures in the rest of the water, wherein the water is preheated to a temperature from 80.0° C. to 90.0° C. before mixing, thereby obtaining a second mixture;

mixing said first and second mixture at a temperature from 80.0° C. to 100.0° C., preferably from 85.0° C. to 95.0° C., preferably under constant stirring, thereby obtaining a third mixture;

adjusting the pH of the third mixture to a value from 2.8 to 4.5, preferably from 3.0 to 4.3, more preferably from 3.4 to 4.2;

optionally adding a preservative to the third mixture;

maintaining the third mixture at a temperature from 80° C. to 100° C., preferably from 85° C. to 95° C., for a period from 1 to 10 minutes, preferably from 3 to 6 minutes, preferably under constant stirring; and optionally packaging the mixture, preferably at a temperature above 70° C.

In particular embodiments, if the co-texturizer is a combination of hydroxypropyl distarch phosphate and sodium carboxymethylcellulose, said method comprises the steps of pre-dissolving or pre-dispersing sodium carboxymethylcellulose in part of the water, wherein the water has a temperature from 15.0 to 35.0° C.;

mixing the one or more sugars, the CPH, (part of) the citrate ions, the pre-dissolved or pre-dispersed sodium carboxymethylcellulose, the hydroxypropyl distarch phosphate and optionally part of the water, thereby obtaining a first mixture;

heating said first mixture to a temperature from 85.0° C. to 95.0° C. for a period of from 1 to 15 minutes, preferably under constant stirring;

mixing pectin and the rest of the water, wherein the water is preheated to a temperature from 80.0° C. to 90.0° C. before mixing, thereby obtaining a second mixture;

mixing said first and second mixture at a temperature from 80.0° C. to 100.0° C., preferably from 85.0° C. to 95.0° C., preferably under constant stirring, thereby obtaining a third mixture;

adjusting the pH of the third mixture to a value from 2.8 to 4.5, preferably from 3.0 to 4.3, more preferably from 3.4 to 4.2;

optionally adding a preservative to the third mixture;

maintaining the third mixture at a temperature from 80° C. to 100° C., preferably from 85° C. to 95° C., for a period from 1 to 10 minutes, preferably from 3 to 6 minutes, preferably under constant stirring; and optionally packaging the mixture, preferably at a temperature above 70° C.

The mixing of the ingredients may be performed in any suitable equipment known in the art, such as a device that is equipped with a mixing device and a temperature control. Preferably, the mixing device is a high shear mixing device. A non-limiting example of a suitable equipment for small scale mixing and heating is a Thermomix® mixer. Non-limiting examples of suitable equipment for large scale mixing and heating include any mixer or blender able to mix and heat at low, intermediate and/or high shear level, any vacuum cooking reactors, any vacuum cooking vessel and appropriate combinations thereof.

In particular embodiments, the composition as taught herein is a sweet jellied food paste. Jellified food pastes are a sub-category of food pastes in which hydrocolloids, preferably pectin, have reacted, preferably by cross-linking, to give a texture ranging from smooth paste to a thick firm jelly structure. The term "sweet jellied food paste" as used herein refers to a food composition of a soft, elastic consistency due to the presence of one or more water-soluble hydrocolloids, such as pectin or gelatin, having a sweet taste. Non-limiting examples of sweet jellied food pastes are jam, marmalade, filling for food products and topping, glazing or icing for food products.

In particular embodiments, the composition as taught herein is a sweet filling and/or topping for food products.

As stated elsewhere herein, present inventors have surprisingly found that the taste of food compositions can become desirable by incorporating (whole) CPH, preferably (whole) CPH powder into the food composition, especially when the (whole) CPH is combined with one or more sugars and water-soluble hydrocolloids, such as pectin and one or more co-texturizers. The taste of such food compositions is described differently by different individuals, making it very unique. Depending of the individual, the taste of such food compositions, preferably jellied food pastes, is described as having a fruity note associated with fig, apple, citrus, orange or sour apricot.

The present invention also provides the use of CPH as a flavouring agent in a food composition, preferably a jellied food paste, such as a filling or topping.

The present invention also provides the use of CPH as a flavouring agent in a composition, wherein the composition is a jellied food paste or a composition for preparing a jellied food paste.

The present invention also provides the use of CPH for improving the taste and/or texture of a food composition, preferably a jellied food paste, such as a filling or topping.

The term "flavouring agent" or "flavourant" as used herein, refers to a food grade agent which gives flavour and contributes to the overall taste and smell of a food product when being incorporated therein.

The present invention also provides the use of the composition as taught herein as a filling in and/or a topping on a food product, preferably a sweet food product. Suitable methods to apply a topping onto or to inject a filling into a food product are well known to the skilled person and comprise, for example, piping, scooping, spreading or extrusion. The present invention also provides a food product, preferably a sweet food product, comprising the composition as taught herein, preferably as a filling and/or topping.

The term "sweet food product" as used herein refers to its broadest meaning, and particularly denotes edible products which have an overall sweet taste. Sweet food products can comprise (e.g. as a filling and/or topping) a jellied food paste. The sweet food product may be (rich or sweet) bakery products, (fine) patisserie products, chocolate, (fine) chocolate confectionery products and (fine) sugar confectionery products. The sweet food product may be a baked food product (e.g. sweet breads, sweet buns, pies, cakes (cupcakes, steam cakes, sponge cakes, cream cakes), cheesecakes, muffins, Danish pastries, croissants, donuts, waffles, cookies) or a non-baked food product (e.g. chocolate bars, snack bars, pralines, chocolate-coated marshmallows). Non-limiting examples of suitable sweet food products comprise sweet breads, sweet buns, pies, cakes (cupcakes, steam cakes, sponge cakes, cream cakes), cheesecakes, desserts, mousses, candy bars, muffins, Danish pastries, sweet rolls, croissants, donuts, waffles, cookies, chocolate bars, snack bars, pralines and chocolate-coated marshmallows.

The term "filling" as used herein refers to a product that can be applied in any bakery products, (fine) patisserie products, chocolate, (fine) chocolate confectionery products and (fine) sugar confectionery products, such as but not limited to pies, cakes, desserts, mousses, candy bars, cupcakes, muffins, Danish pastries, sweet rolls, croissants, donuts, chocolate bars, pralines and chocolate-coated marshmallows for the purpose, for example but not limited to, of decorating and/or flavouring.

The term "topping" as used herein refers to a product that can be applied onto any bakery products, (fine) patisserie products, chocolate, (fine) chocolate confectionery products and (fine) sugar confectionery products such as but not limited to pies, cakes, desserts, mousses, candy bars, cupcakes, muffins, Danish pastries, sweet rolls, croissants, donuts, chocolate bars, pralines and chocolate-coated marshmallows for the purpose, for example but not limited to, of decorating and/or flavouring.

In particular embodiments, if the food product is a baked product, the composition as taught herein may be added to the baked product before or after baking, preferably after baking.

The present invention also provides a method for preparing a sweet food product, comprising the steps of filling the sweet food product with the composition as taught herein.

The present invention also provides a method for preparing a sweet food product, comprising the steps of topping the sweet food product with the composition as taught herein.

The person skilled in the art will understand that the particular embodiments of the composition as taught herein are also applicable to the methods and uses as taught herein and vice versa.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The above aspects and embodiments are further supported by the following non-limiting examples.

EXAMPLES

Example 1: Preparation and Characterization of a Composition as Taught Herein Compositions were prepared using the ingredients as listed in table 1.

Preparation of Cacao Pod Husk Powder

Cacao pods were cut in two parts with a machete and the cacao beans were removed. The cacao pod husks were cut in about 8 pieces and sun dried for about 10 days. After drying the cacao pod husks were grinded using a Mockmill® grain mill until a fine powder is obtained. The powder was subsequently sieved and the fraction passing through a sieve of 200 µm was kept for further use.

TABLE 1

| In % (w/w) | Reference composition | Composition 1 as taught herein |
|---|---|---|
| Glucose syrup (Dextrose equivalent > 55; dry matter: 70-83%) | 61.8 | 60 |
| Cacao pod husk powder (particle size < 200 µm) | 0 | 2.4 |
| Sucrose | 11.93 | 9 |
| Calcium citrate | 0.18 | 0.2 |
| Sodium citrate (33% solution) | 0.3 | 0.3 |
| Pectin (Degree of esterification < 50%) | 0.91 | 1 |
| Sodium alginate | 0.52 | 0.5 |
| Citric acid (50% solution) | 0.7 | 1.7 |
| Potassium sorbate (33% solution) | 0.3 | 0.3 |
| Soft water | up to 100 | up to 100 |

Preparation of Compositions

CPH powder (if present) was mixed with glucose syrup, sucrose, calcium citrate and sodium citrate using a high shear Thermomix® to obtain a first mixture. Under constant stirring, the first mixture was heated up to 90° C. A second mixture was prepared by mixing the pectin and the sodium alginate in hot water (90° C.) until pectin and alginate are dissolved.

The first and second mixture were combined at a temperature of 90° C. to obtain a third mixture and acidified by the dropwise addition of the citric acid solution. Potassium sorbate was then added to the mixture. The mixture was kept at 90° C. for 3 minutes and water was added to compensate the loss of water during the process.

At the end of the heating stage the compositions were poured in containers at 80-85° C. that were subsequently hermetically closed with a headspace of maximum 1 cm between the product and the lid of the container. The product was then allowed to cool at room temperature and stored at the same temperature.

Characterization of Compositions

The properties of the compositions were evaluated and are depicted in table 2. FIG. 1 shows a picture of both compositions (left: reference composition/right: composition as taught herein)

TABLE 2

| | Reference composition | Composition 1 as taught herein |
|---|---|---|
| pH | 3.8 | 3.6 |
| Brix | 65 | 66 |
| Water activity | 0.85 | 0.85 |
| Colour | light yellow | dark brown |
| Visual aspect | brittle, not smooth | smooth |
| Texture | not hard, brittle, fragile | very elastic gel |
| Mouthfeel | not smooth | smooth, not sticky |
| Taste | sweet | sweet |
| Flavour | none | fruity* |

*The flavour of the composition 1 as taught herein was further described by the panel of expert as being new, unique and surprising. Depending of the expert, the fruity note was associated with fig, apple, citrus, orange or sour apricot.

Example 2: Use of the Composition 1 as Taught Herein as a Filling in Cupcakes Cupcakes were prepared as follow:
Mix 53.4% of Tegral Satin Cream Cake (Puratos, Belgium), 12% of water, 18.6% of eggs and 16% of oil.
Pour 45 g of cream cake batter in cupcake paper moulds.
Bake at 180° C. for 27 min.

Figure 2:
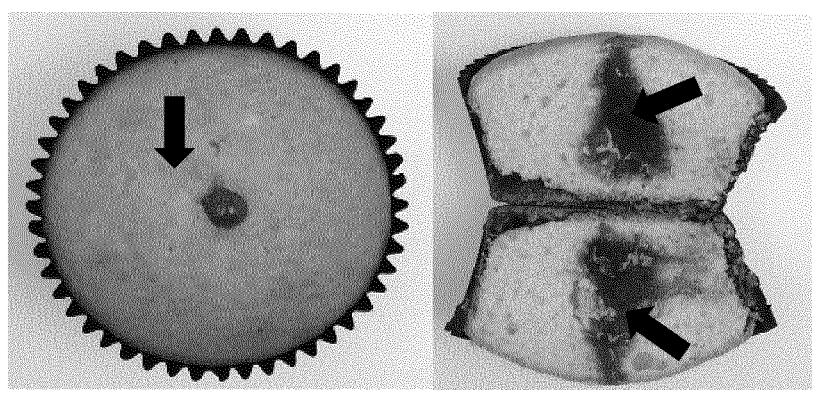
FIG. 2 shows a picture of a cupcake after injection of a composition according to the invention as a filling (left panel) and a picture of a cross section of the same cupcake (right panel). The composition according to the invention is indicated by an arrow.

After baking, about 8 g of the composition 1 as taught herein as described in example 1 was injected into the cupcakes as a filling (top middle). FIG. 2 shows a picture of a cupcake after injection of the composition 1 as taught herein (left panel) and a picture of a cross section of the same cupcake (right panel).

The cupcakes were evaluated by a panel of persons trained to taste patisserie products and in particular cakes and cupcakes. Cupcakes, and in particular their filling, were described as tasty and fruity with a pleasant texture. The flavour profile was described as rich and delicate without the artificial flavour usually found in regular cupcakes.

Figure 3:
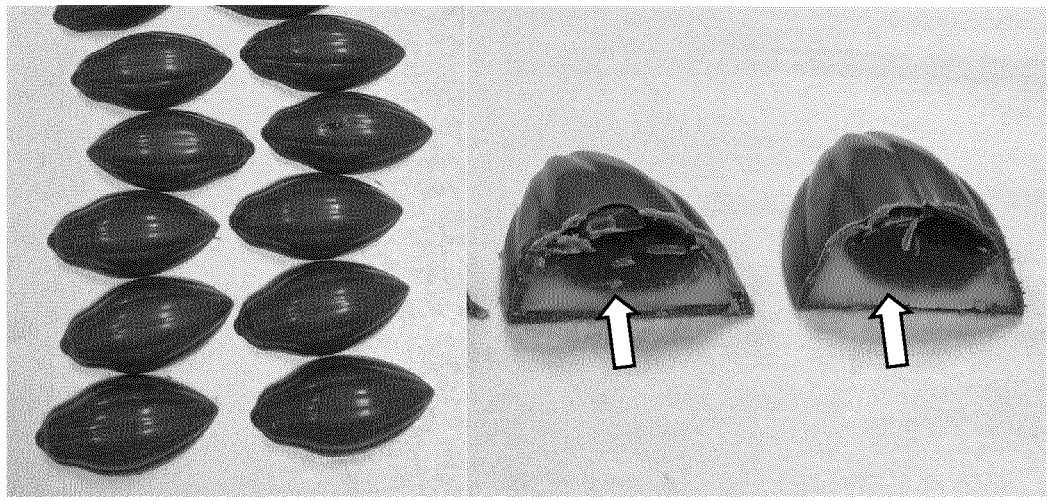
FIG. 3 shows a picture of pralines comprising a composition according to the invention as a filling (left panel) and of a cross-section of the same pralines (right panel). The composition according to the invention is indicated by an arrow.

Example 3: Use of the Composition 1 as Taught Herein as a Filling in Belgian Pralines and Marshmallows The composition 1 as taught herein as described in example 1 was used to prepare Belgian pralines using ordinary methods in the art. The pralines have a core made of white soft ganache with the composition as taught herein on its top and has a shell made of milk chocolate. FIG. 3 shows a picture of the pralines (left panel) and of a cross-section of the pralines made with the composition 1 as taught herein as a filling (right panel).

The pralines were evaluated by a panel of persons trained to taste chocolate products and in particular pralines. The pralines were described as having an additional agreeable and fruity taste with a pleasant texture compared with a regular praline.

Figure 4:
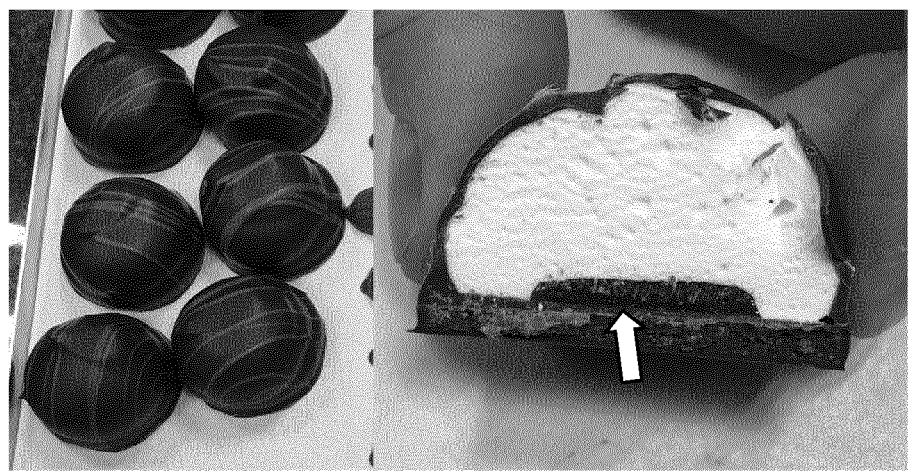
FIG. 4 shows a picture of marshmallows comprising a composition according to the invention as a filling (left panel) and of a cross-section of the same marshmallow (right panel). The composition according to the invention is indicated by an arrow.

The composition 1 as taught herein as described in example 1 was used during the preparation of marshmallows made using ordinary methods in the art. The marshmallows have a bottom part made of a biscuit in chocolate-containing speculoos covered by a layer of the composition 1 as taught herein, an inner part made of marshmallow and a shell made of dark chocolate. FIG. 4 shows a picture of the marshmallows (left panel) and of a cross-section of a marshmallow made with the composition 1 as taught herein as a filling (right panel).

The marshmallows were evaluated by the same panel. The marshmallows were described as having a delicate and appreciated citrus taste.

Example 4: Preparation and Characterization of a Composition 2 as Taught Herein A composition 2 as taught herein was prepared using the ingredients of table 3. Calcium ions concentration in the composition was determined as being 0.02%.

TABLE 3

| In % (w/w) | |
| --- | --- |
| Sucrose | 34 |
| Glucose syrup (Dextrose equivalent > 55; dry matter : 70-83%) | 13 |
| Sodium carboxymethycellulose (E466) | 0.1 |
| Hydroxypropyl distarch phosphate | 6 |
| Pectin (Degree of esterification < 50%) | 0.4 |
| Cacao pod husk powder as prepared in example 1 | 2.4 |
| Trisodium citrate (33% solution) | 1.4 |

TABLE 3-continued

| In % (w/w) | |
| --- | --- |
| Potassium sorbate (33% solution) | 0.2 |
| Citric acid (50% solution) | 1.4 |
| Soft water | up to 100 |

Preparation of a Composition 2 as Taught Herein

About 80% of the water and cellulose were mixed for 15 minutes with a high shear Thermomix®. Hydroxypropyl distarch phosphate was added and mixed for 2 minutes. Subsequently, sugars were added, mixed and to obtained solution was heated to 60° C. Next, trisodium citrate, potassium sorbate and cacao pod husk powder were added and the mixture was heated to 91-92° C. until the Hydroxypropyl distarch phosphate was fully gelatinized (about 5 to 10 minutes). Then citric acid was added. In another container, pectin was mixed with the rest of the water preheated to 85° C.

Then, the two solutions were combined and mixed for about 2 minutes at 85-90° C. Next, the mixture was cooled to 75° C., poured into containers keeping a headspace of maximum 1 cm between the product and the lid of the container, and the containers were hermetically closed. The mixture is allowed to cool at room temperature.

Characterization of a Composition 2 as Taught Herein

The properties of the composition 2 as taught herein was evaluated and are depicted in table 4.

TABLE 4

| | Composition 2 as taught herein |
| --- | --- |
| pH | 4.0 |
| Brix | 56 |
| Water activity | 0.92 |
| Colour | dark brown |
| Visual aspect | smooth |
| Texture | very elastic gel |
| Mouthfeel | smooth, not sticky |
| Taste | sweet |
| Flavour | fruity* |

*The flavour of the composition as taught herein was further described by the panel of expert as being new, unique and surprising. Depending of the expert, the fruity note was associated with fig, apple, prune, plum, apricot.

Use of Composition 2 as Taught Herein in Cupcakes as a Filling

Figure 5:
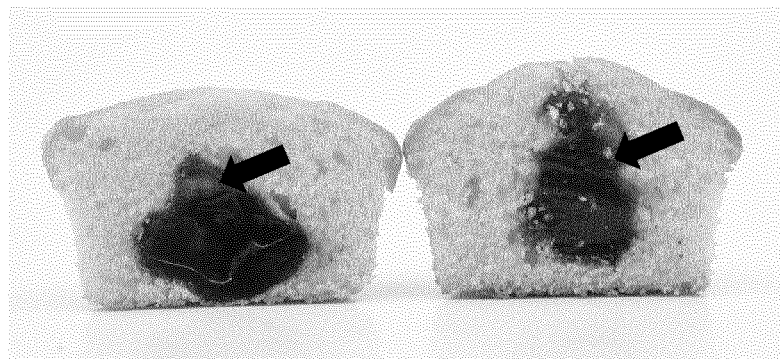
FIG. 5 shows cross-sections of cupcakes with a composition according to the invention injected as a filling into the cupcake before (left panel) or after (right panel) baking. The composition according to the invention is indicated by an arrow.

Cupcakes were prepared as in example 2. In one experiment about 8 g of the composition 2 as taught herein were injected into the batter before baking. In a second experiment about 8 g of the composition 2 as taught herein were injected after baking as in example 2. After baking, about 8 g of the composition 2 as taught herein were injected into the cupcakes (top middle). FIG. 5 shows a picture of the cross section of a cupcake where the composition 2 as taught herein has been added before (left panel) or after (right panel) baking as a filling.

The cupcakes were evaluated by the same panel as in example 2, being a panel of persons trained to taste patisserie products and in particular cakes and cupcakes. When the composition 2 as taught herein was injected before baking, the product was described as being slightly drier but not with an unpleasant texture. As in example 2, cupcakes, and in particular their filling, were described as tasty and fruity. The flavour profile was similarly described as rich and delicate without the artificial flavour usually found in regular cupcakes.

The invention claimed is:

1. A jellied food paste comprising from 0.150 to 7.50% (dry matter weight/weight (w)) cacao pod husk (CPH), wherein CPH encompasses the whole pod shell of the cacao fruit either with or without the epicarp.

2. The jellied food paste according to claim 1 further comprising one or more sugars, one or more food-grade water-soluble hydrocolloids, food grade citrate ions, water and optionally one or more preservatives.

3. The jellied food paste according to claim 2, wherein the one or more food grade water-soluble hydrocolloids comprise pectin and one or more co-texturizers.

4. The jellied food paste according to claim 1, wherein the jellied food paste has a Brix comprised from 45 to 75 and/or a pH from 2.8 to 4.5.

5. A composition comprising
from 5.0 to 70.0% (dry matter weight/w) of one or more sugars;
from 0.150 to 7.50% (dry matter weight/w) of CPH, wherein CPH encompasses the whole pod shell of the cacao fruit either with or without the epicarp;
from 0.10 to 4.0% (w/w) of pectin;
from 0.10 to 7.0% (w/w) of one or more co-texturizers;
from 0.030 to 3.0% (w/w) of citrate ions;
from 0.0010 to 0.50% (w/w) of calcium ions;
from 0.0 to 2.0% (w/w) of preservative; and
water up to 100.0%;
wherein the composition has a Brix comprised from 45 to 75 and a pH from 2.8 to 4.5; and
wherein the composition is a jellied food paste or a composition capable of jellifying into a jellied food paste.

6. The jellied food paste according to claim 1, wherein the CPH is CPH powder.

7. The jellied food paste according to claim 6, wherein the CPH powder has a maximal particle size of less than 200 µm.

8. The composition according to claim 5, wherein the composition does not comprise white pulp from the cacao beans.

9. The composition according to claim 5, wherein the one or more sugars are present in the form of sucrose and glucose syrup.

10. The composition according to claim 9, wherein the glucose syrup has a dextrose equivalent of more than 55.

11. The composition according to claim 5, wherein the one or more co-texturizers are selected from the group consisting of alginates, galactomannans, locust bean gum, gellans, celluloses, starches, and carrageenans, or a combination thereof.

12. The composition according to claim 5, wherein pectin has a degree of esterification of less than 50%.

13. A food product comprising the jellied food paste according to claim 1 as a filling and/or topping.

14. A method for preparing a composition according to claim 5 comprising the step of mixing the ingredients of the composition as defined in claim 5.

15. A method for preparing a composition with a Brix comprised from 45 to 75
comprising
from 5.0 to 70.0% (w/w) of one or more sugars;
from 0.150 to 7.50% (w/w) of CPH, wherein CPH encompasses the whole pod shell of the cacao fruit either with or without the epicarp;
from 0.10 to 4.0% (w/w) of pectin;
from 0.10 to 7.0% (w/w) of one or more co-texturizers;
from 0.030 to 3.0% (w/w) of citrate ions;
from 0.0010 to 0.50% (w/w) of calcium ions;
from 0.0 to 2.0% (w/w) of preservative; and
water up to 100.0%;
wherein the composition is a jellied food paste or a composition capable of jellifying into a jellied food paste;
(a) with the proviso that if the one or more co-texturizers consist of one or more co-texturizers that are pre-dissolved or pre-dispersed in water at a low temperature said method comprises the steps of:
mixing the one or more sugars, the CPH, the citrate ions, the one or more co-texturizers that are pre-dissolved or pre-dispersed in water at a low temperature and optionally part of the water, thereby obtaining a first mixture;
heating said first mixture to a temperature from 80.0° C. to 100.0° C.;
mixing pectin in the rest of the water, wherein the water is preheated to a temperature from 80.0° C. to 90.0° C. before mixing, thereby obtaining a second mixture;
mixing said first and second mixture at a temperature from 80.0° C. to 100.0° C., thereby obtaining a third mixture;
adjusting the pH of the third mixture to a value from 2.8 to 4.5;
optionally adding a preservative to the third mixture;
maintaining the third mixture at a temperature from 80.0° C. to 100.0° C., for a period from 1 to 10 minutes;
and optionally packaging the mixture;
(b) with the proviso that if the one or more co-texturizers consist of one or more co-texturizers that are pre-dissolved or pre-dispersed in water at a high temperature, said method comprises the steps of:
mixing the one or more sugars, the CPH, the citrate ions and optionally part of the water, thereby obtaining a first mixture;
heating said first mixture to a temperature from 80.0° C. to 100.0° C.;
mixing pectin and the one or more co-texturizers that are pre-dissolved or pre-dispersed in water at a high temperature in the rest of the water, wherein the water is preheated to a temperature from 80.0° C. to 90.0° C. before mixing, thereby obtaining a second mixture;
mixing said first and second mixture at a temperature from 80.0° C. to 100.0° C., thereby obtaining a third mixture;
adjusting the pH of the third mixture to a value from 2.8 to 4.5;
optionally adding a preservative to the third mixture;
maintaining the third mixture at a temperature from 80.0° C. to 100.0° C., for a period from 1 to 10 minutes; and
optionally packaging the mixture;
(c) with the proviso that if the one or more co-texturizers consist of one or more co-texturizers that are pre-dissolved or pre-dispersed in water at a low temperature and one or more co-texturizers that are pre-dissolved or pre-dispersed in water at a high temperature, said method comprises the steps of:
mixing the one or more sugars, the CPH, the citrate ions, the one or more co-texturizers that are pre-dissolved or pre-dispersed in water at a low temperature and optionally part of the water, thereby obtaining a first mixture;
heating said first mixture to a temperature from 80.0° C. to 100.0° C.;
mixing pectin and the one or more co-texturizers that are pre-dissolved or pre-dispersed in water at a high temperature in the rest of the water, wherein the water is preheated to a temperature from 80.0° C. to 90.0° C. before mixing, thereby obtaining a second mixture;

mixing said first and second mixture at a temperature from 80.0° C. to 100.0° C., thereby obtaining a third mixture;

adjusting the pH of the third mixture to a value from 2.8 to 4.5;

optionally adding a preservative to the third mixture;

maintaining the third mixture at a temperature from 80.0° C. to 100.0° C., for a period from 1 to 10 minutes; and optionally packaging the mixture.

16. A food product comprising the composition according to claim 5 as a filling and/or topping.

17. The food product according to claim 16, wherein the food product is a sweet food product.

18. The composition according to claim 5, wherein the CPH is CPH powder.

19. The composition according to claim 18, wherein the CPH powder has a maximal particle size of less than 200 µm.

* * * * *